United States Patent [19]

Fujiki et al.

[11] Patent Number: 4,566,046
[45] Date of Patent: Jan. 21, 1986

[54] POSITIONING APPARATUS FOR A MAGNETIC HEAD OF A MAGNETIC DISK DRIVE APPARATUS

[75] Inventors: Masao Fujiki, Hamura; Kazukuni Seguchi, Oume, both of Japan

[73] Assignee: Tokyo Shibaura Denki Kabushiki Kaisha, Kawasaki, Japan

[21] Appl. No.: 744,904

[22] Filed: Jun. 17, 1985

Related U.S. Application Data

[63] Continuation of Ser. No. 598,404, Apr. 11, 1984, abandoned, which is a continuation of Ser. No. 334,911, Dec. 28, 1981, abandoned.

[30] Foreign Application Priority Data

Jan. 9, 1981 [JP] Japan .................................. 56-1188

[51] Int. Cl.$^4$ ..................... G11B 21/08; G11B 17/00; G05B 5/01
[52] U.S. Cl. ........................................ 360/78; 360/75; 360/86; 360/97; 318/618
[58] Field of Search .................................. 360/75-76, 360/78, 86, 97-99; 318/632

[56] References Cited

U.S. PATENT DOCUMENTS

| 3,924,268 | 12/1975 | McIntosh et al. | 360/78 |
| 4,139,874 | 2/1979 | Shiraishi | 360/86 |
| 4,285,015 | 8/1981 | Rose et al. | 360/78 |
| 4,288,731 | 9/1981 | Lee | 360/78 |
| 4,321,517 | 3/1982 | Touchton et al. | 360/78 X |
| 4,331,989 | 5/1982 | Viskochil | 360/86 |
| 4,336,718 | 6/1982 | Washburn | 318/632 X |
| 4,439,800 | 3/1984 | Powell | 360/78 |
| 4,485,414 | 11/1984 | Baker | 360/75 X |

OTHER PUBLICATIONS

IBM Disk Storage Technology, pp. 89-97, "Servo Design for an Eight-Inch Disk File", Commander et al.; Feb. 1980.
Oswald, "Design of a Disk File-Head-Positioning Servo", IBM J. Res. Develop., pp. 506-512.

Primary Examiner—Aristotelis M. Psitos
Attorney, Agent, or Firm—Oblon, Fisher, Spivak, McClelland & Maier

[57] ABSTRACT

A positioning apparatus for a magnetic disk drive apparatus including a biasing means for returning a carriage on which the magnetic head is mounted to a fixed position whenever a power source for the apparatus is cut off, and force compensation circuits operably connected to the carriage for supplying the carriage with an opposite force equivalent to the force of the biasing means as a function of the magnetic head position relative to the disk. The control force compensation circuits the speed of the carriage as it changes position from one track to another track and maintain the magnetic head in proper position over the selected track once it is reached.

6 Claims, 1 Drawing Figure

POSITIONING APPARATUS FOR A MAGNETIC HEAD OF A MAGNETIC DISK DRIVE APPARATUS

This application is a continuation of application Ser. No. 598,404, filed Apr. 11, 1984, now abandoned, which is a continuation of application Ser. No. 334,911, filed Dec. 28, 1981, now abandoned.

BACKGROUND OF THE INVENTION

1. Field of the Invention

This invention relates to a positioning apparatus for the magnetic head of a magnetic disk drive apparatus.

2. Description of the Prior Art

Recently, there has been developed a magnetic disk drive apparatus using a spring to return a carriage, on which a magnetic head is mounted, to a fixed position whenever a power source is cut off. In order to position the head over a desired track, it is necessary to overcome the biasing force of the spring on the carriage. The prior art magnetic disk drive apparatus compensates for the biasing effects of the spring by using a controller which includes a low pass integrator to position and keep the magnetic head positioned over the desired track. If the time constant of the low pass integrator is too small, however, the closed loop of the controller might oscillate and the time constant therefore must be sufficiently large. If the time constant is too large, however, unfortunately the transient time in changing from speed control of the magnetic head to position control of the magnetic head to keep it on track becomes too long.

SUMMARY OF THE INVENTION

It is accordingly, a principal object of this invention to provide a new and improved positioning apparatus for a magnetic head of a magnetic disk drive apparatus which enables positioning of the head relative to the force of the spring exerted on the carriage for a selected target track.

It is another object of the invention to provide a positioning apparatus for a magnetic head which takes into account the biasing effects of the spring on the carriage on which the magnetic head is mounted in controlling the position of the magnetic head.

It is still another object of the invention to provide a positioning apparatus for a magnetic head which takes into account the biasing effects of the spring on the carriage on which the magnetic head is mounted when changing the position of the magnetic head and still maintains the transient time for the change of position within acceptable limits.

It is a further object of the invention to provide a new and improved positioning apparatus for a magnetic head which demonstrates quick, responive characteristics.

These and other objects are achieved according to the invention by providing a new and improved positioning apparatus for a magnetic head of a magnetic disk drive apparatus including a spring for returning the carriage, on which the magnetic head is mounted, to a fixed position whenever the power source for the apparatus is cut off, and force compensation means for supplying the carriage with enough power to overcome the force of the spring as determined by the desired track position of the magnetic head.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
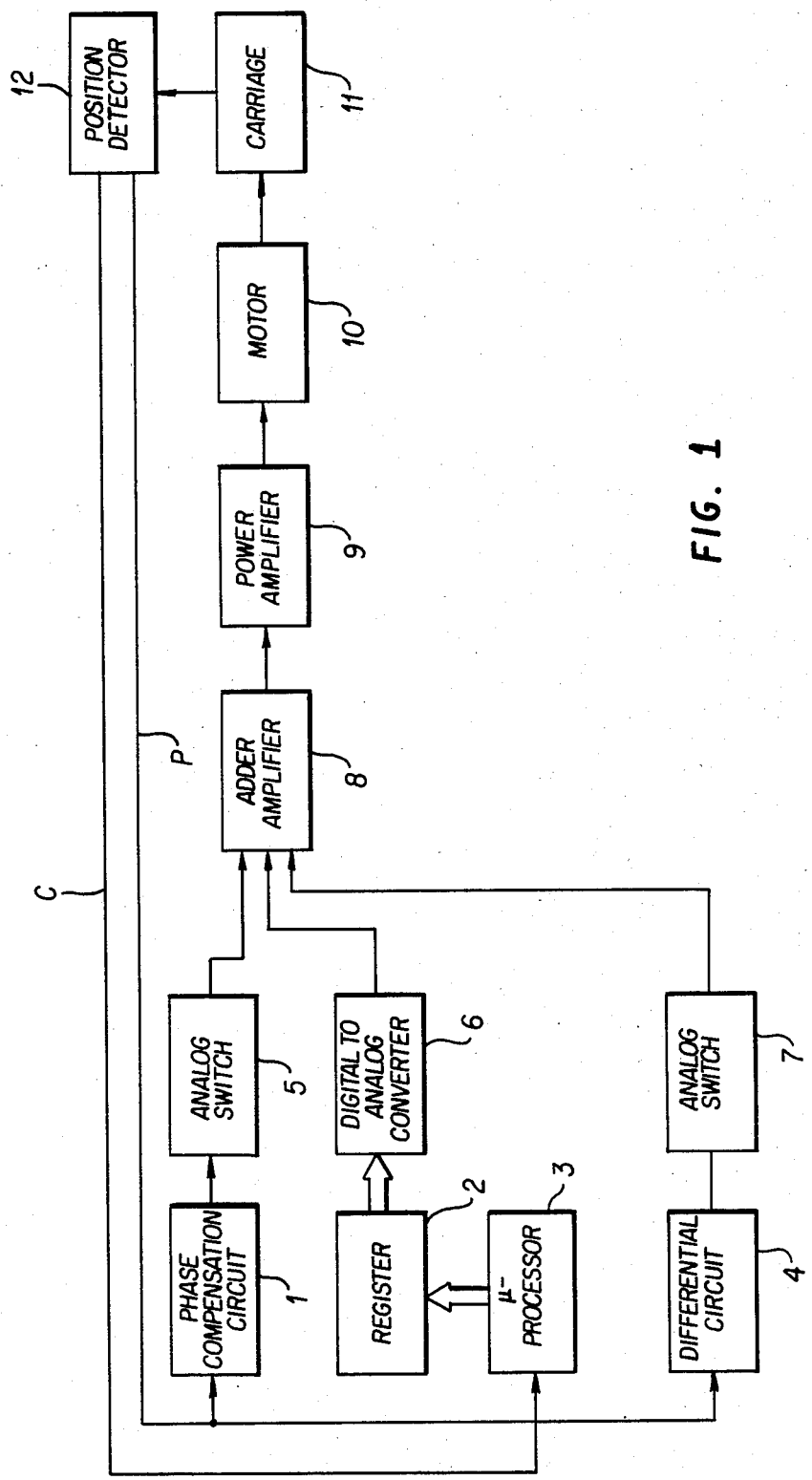
FIG. 1 is a block diagram of one embodiment of the present invention.

Referring to FIG. 1, a phase compensation circuit 1, a register 2, a microprocessor 3, a differential circuit 4, two analog switches 5 and 7, a digital to analog (D-A) convertor 6, an adder amplifier 8, a power amplifier 9, a motor 10, and a carriage, which is adapted to a servo head and a read/write head (not shown), are shown. The carriage 11 is connected to a spring (not shown) which returns it to a fixed position whenever the power source (not shown) for the apparatus is cut off. Also included is a position detector 12 which produces a position output signal P in response to servo data read from the magnetic disk (not shown) by the magnetic head and a cylinder pulse C generated whenever the magnetic head crosses a track on the magnetic disk.

If the spring constant is K and its displacement is x, the force F generated by the spring is expressed as $F=Kx$. The force F of the spring exerted on the carriage 11 can be obtained dependent upon the position of the carriage relative to a desired track if the spring constant is known. When a target track is designated by the system, the microprocessor calculates the force of the spring F in accordance with the position of the target track using the above mentioned equation. The microprocessor then calculates the distance between the track of which the magnetic head is presently positioned and the target track and directs speed information, as determined by the distance between the present track location and the desired location, in the form of a calculated digital speed signal to the register 2. It should be realized that the microprocessor 3 has previously stored speed information corresponding to the distance between the present track and the desired track in its memory. The calculated speed information stored in the register 2 is then supplied the D-A convertor 6. The D-A convertor 6 changes the calculated digital speed signal to a calculated analog speed signal and directs it to the adder amplifier 8. However, the differential circuit 4 forms a second speed signal by differentiation of the position signal P supplied by the position detector 12 and directs it to the adder amplifier 8 through the analog switch 7. At that time the analog switch 7 is cut off. The adder amplifier 8 subtracts the second speed signal from the calculated analog speed signal. The power amplifier converts the output signal from the amplifier 8 to current which is then converted to a force by the motor 7. Therefore, the motor 7 accelerates the carriage 11 in response to the output signal from the adder amplifier 8. The microprocessor (3) receives the cylinder pulse C whenever the magnetic head mounted on the carriage 11 crosses another track as it moves towards the desired track. The microprocessor 3 calculates the new distance between the track just crossed and the desired track upon receipt of the cylinder pulse C and directs the new speed information to the register 2. The microprocessor 3 repeats the aforementioned operation, controlling the speed of the carriage 11 until the magnetic head reaches the target track. Once the magnetic head is over the target track, the analog switch 7 turns off and the analog switch 5 turns on so that the speed control ceases and the positioning control commences to position the magnetic head properly above the target track.

The positioning control occurs by way of the closed loop comprises of the phase compensation circuit 1, the analog switch 5, the adder amplifier 8, the power amplifier 9, the motor 10, the carriage 11 and the position detector 12. The microprocessor 3 loads the previously calculated force F of the spring into the register 2, which is determined by the position of the target track. The force F of the spring is changed to a voltage signal by the D-A converter 6. The voltage signal is changed to a force through the adder amplifier 8, the power amplifier 9 and the motor 10. The head is then positioned properly above the target track because the force of the motor 10 is equivalent to the force F of the spring. If the force of the motor 10 begins to decrease relative to the force of the spring, the analog switch 5 enables a voltage corresponding to the force of the spring to be generated and thus prevents the magnetic head from shifting its position. The force of the spring is determined by the position of the target track. When the proper voltage is supplied to the motor such that the force of the motor is equal and opposite to the force of the spring, the magnetic head will be properly positioned above the target track without shifting its position. Whenever the magnetic head is properly positioned above the target track (i.e. the power or force of the motor 10 is equal to and opposite to the force F of the spring), the input to the adder amplifier 8 from the phase compensation circuit 1 through the analog switch 5 will be zero volts. The phase compensation circuit 1 and the position detector 12 are of conventional design, and an example thereof can be found in Oswald, "Design Of A Disk File Head-Positioning Servo", IBM Journal of Research and Development, pp. 509-512, Nov., 1974. A suitable phase compensation circuit is the IBM 62PC used in the IBM 3310 Disk Storage Unit. A suitable analog switch for implementing the switches 5 and 7 is the LF13201 sold by National Semiconductor Corporation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A positioning apparatus for a magnetic head of a magnetic disk drive apparatus, comprising:
    a carriage;
    means for cutting off the power to said apparatus;
    a magnetic head positioned on said carriage;
    biasing means for returning said carriage holding said magnetic head to a fixed position when said apparatus is in a power-off state, connected to said carriage;
    said biasing means supplying said carriage with the biasing force when said magnetic head is positioned in a desired track position;
    a closed loop feedback circuit for holding said magnetic head in a desired track position;
    means for determining the position of said carriage;
    processor means connected to said mean for determining for calculating the force information of said biasing means acting upon said carriage when said magnetic head is positioned in said desired track position prior to the positioning of said magnetic head in said desired track position; and
    force compensation means independent from said closed loop feedback circuit for supplying said carriage with an opposite force equivalent to the force of said biasing means responding to said force information provided by said processor means when said magnetic head is positioned in said desired track position.

2. A positioning apparatus for a magnetic head of a magnetic disk drive apparatus according to claim 1, wherein said force compensation means comprises:
    register means for storing said force information provided by said processing means when said magnetic head is positioned in said desired track position;
    convertor means for changing said force information stored in said register means to an analog force signal;
    mortor means for driving said carriage and supplying said carriage with enough power to overcome the force of said biasing means; and
    power amplifier means for driving said mortor means in response to said analog force signal.

3. A positioning apparatus for a magnetic disk drive apparatus according to claim 2, wherein said closed loop feedback circuit further comprises:
    position detector means for detecting the position of said magnetic head,
    adder amplifier means for summing phase compensated signal delivered by said compensation circuit means and said analog force signal;
    wherein said power amplifier means amplifies an output signal from said adder amplifier means and applies the amplified output signal to said motor means which drives said carriage based on the amplified output signal.

4. A positioning apparatus for a magnetic head of a magnetic disk drive apparatus according to claim 3 wherein said position detector means comprises:
    means for generating a position signal supplied to said phase compensation circuit means.

5. A positioning apparatus for a magnetic head of a magnetic disk drive apparatus according to claim 4, further comprising:
    differential circuit means supplied with said position signal for forming a present speed signal by differentiation of said position signal;
    said position detector means further including means for generating a cylinder pulse supplied to said processor means to indicate the number of tracks said magnetic head crosses;
    said processor means calculating the distance between the track position of which said magnetic head is presently positioned and the desired track position and setting the target speed information into said register means when said magnetic head is moved to the desired track position;
    said convertor means changing said target speed information stored in said register means to an analog target speed signal;
    said adder amplifier means subtracting said present speed signal from said analog target speed signal;

said power amplifier means converting the output signal of said adder amplifier means to a current which is converted by said motor means to a force for moving said carriage.

6. A positioning apparatus for a magnetic head of a magnetic disk drive apparatus according to claim 5, further comprising:

first switching means electrically connected to said phase compensation circuit means for enabling position control of said magnetic head in an "on" position; and second switching means electrically connected to said differential circuit means for enabling speed control of the movement of said carriage in an "on" position.

* * * * *